May 1, 1962 H. R. DAVIDSON 3,032,269
COLOR MIXTURE COMPUTER
Filed Jan. 14, 1958 4 Sheets-Sheet 1

INVENTOR
HUGH R. DAVIDSON
BY
Burgess, Ryan, & Hicks
ATTORNEYS

May 1, 1962 H. R. DAVIDSON 3,032,269
COLOR MIXTURE COMPUTER
Filed Jan. 14, 1958 4 Sheets-Sheet 3

INVENTOR
HUGH R. DAVIDSON
BY
Burgess, Ryan, & Hicks
ATTORNEYS

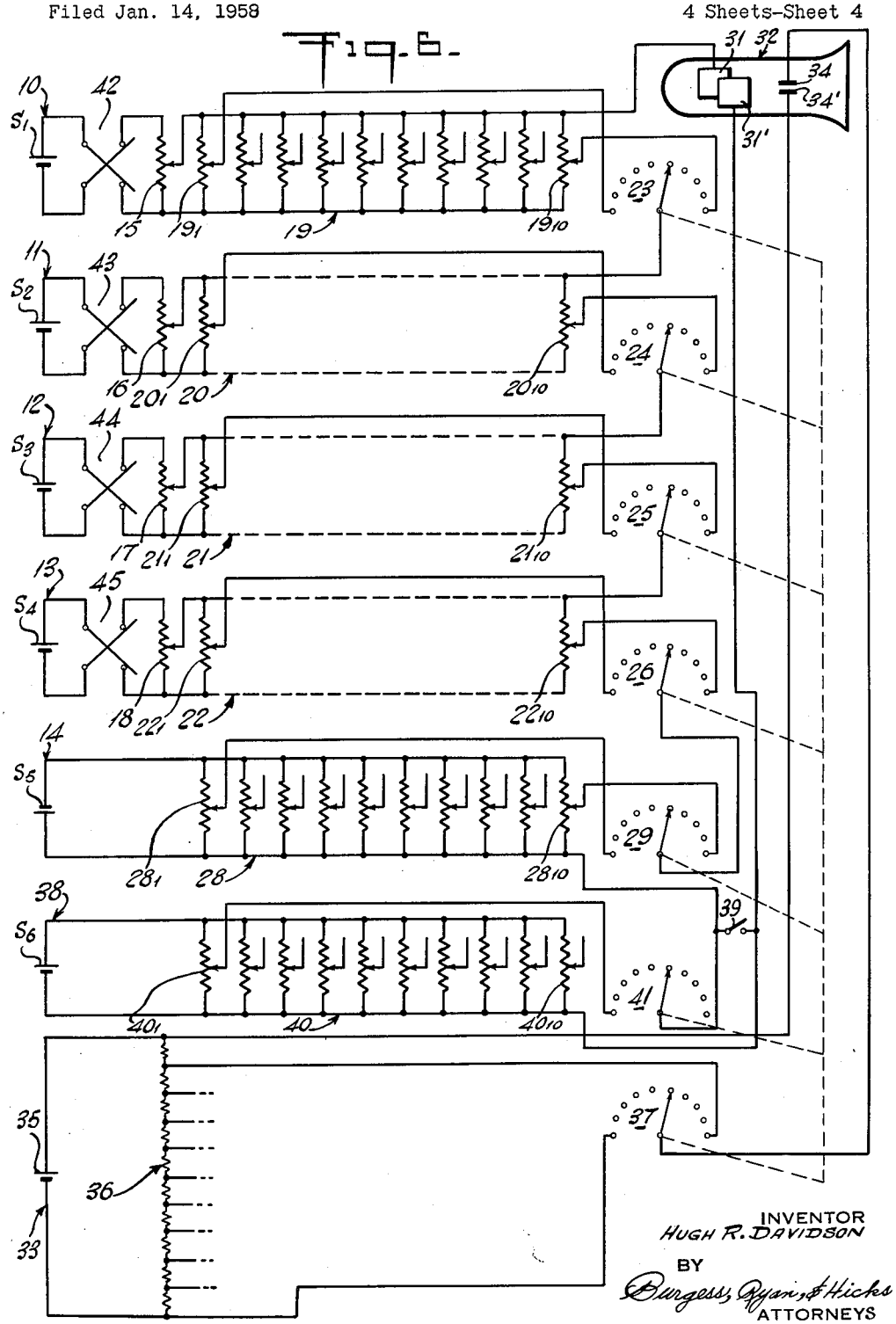

3,032,269
Patented May 1, 1962

3,032,269
COLOR MIXTURE COMPUTER
Hugh R. Davidson, Easton, Pa., assignor to Davidson and Hemmendinger, Easton, Pa., a partnership
Filed Jan. 14, 1958, Ser. No. 708,879
12 Claims. (Cl. 235—180)

The present invention relates to a color mixture computer and relates, more particularly, to an electronic computer system for determining the amounts of colorants required in a mixture to match a given color.

An object of the present invention is to provide a system for electrically determining the amounts or proportions of colorants required in a mixture to match a given color at a number of different wave lengths of light. The present invention enables the proportions of the colorants required in a mixture to match a given color to be determined readily and quickly with a high degree of accuracy.

As is explained in my Patent No. 2,671,609 dated May 9, 1954, if $R_A$, $R_B$, $R_C$ and $R_D$ represent the reflectances or transmittances of four colorants at a specified wave length of light in a given medium or substrate, and if R represents the reflectance or transmittance of a mixture of the four colorants in the proportions $a$, $b$, $c$, $d$, etc., then one may generally write (1) $\quad F(R) = aF(R_A) + bF(R_B) + cF(R_C) + dF(R_D)$ In other words, some function F or R can be found which will be additive in the mixtures. In the case of most transmitting materials, to which Beer's law applies, the appropriate function is (2) $\quad\quad\quad F(R) = \log \dfrac{1}{R}$ In a paint mixture, dye mixture and many other types of mixtures on opaque materials the appropriate relationship is that derived by Kubelka and Monk.

(3) $\quad\quad\quad F(R) = \dfrac{(1-R)^2}{2R}$

For the operation of this invention it is not necessary that the colorant mixture follow exactly either of these laws. It is necessary only that one of these laws or some other known analytical or non analytical relationship be followed approximately.

It is to be understood that this invention may be used for predicting mixtures for either reflectance or transmittance colors and that wherever "reflectance" is specified below, "transmittance" may be substituted.

Other objects and advantages of the present invention will be apparent and best understood from the following description and the accompanying drawings in which:

FIG. 6 is a schematic wiring diagram of the color mixture computer shown in FIG. 5.

Figure 1:
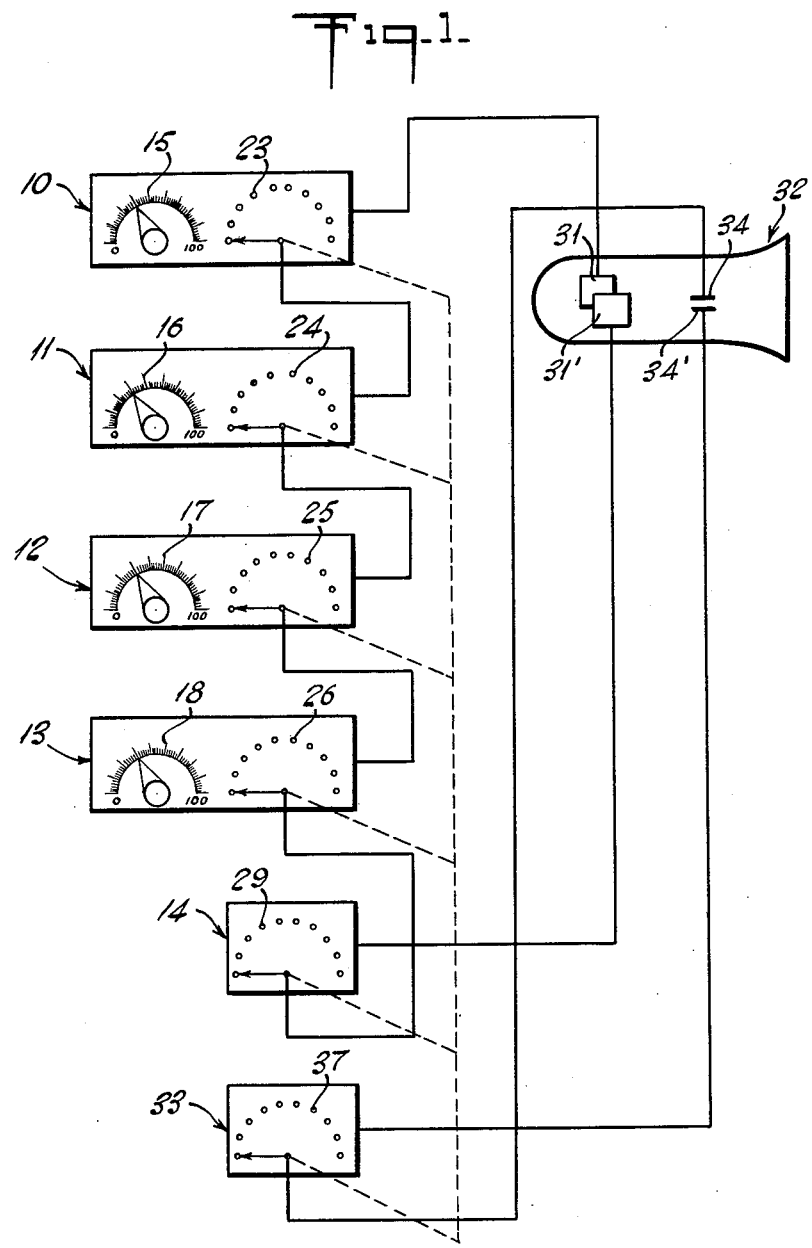
FIG. 1 is a block diagram of a color mixture computer embodying the invention.

Referring to the drawings and to FIG. 1 in particular, circuits 10, 11, 12, and 13, respectively, supply voltages which are proportional to an appropriate function of the amount of colorants A, B, C and D in a mixture at a number of different wave lengths of light.

In other words, the circuits 10, 11, 12, and 13, respectively, supply voltages which are proportional to $aF(R_A)$, $bF(R_B)$, $cF(R_C)$ and $dF(R_D)$ at a number of different wave lengths of light, where $a$, $b$, $c$ and $d$ represent the amounts or proportions of the colorants A, B, C and D, respectively, in the mixture; $R_A$, $R_B$, $R_C$ and $R_D$ represent the reflectance of the respective colorants; and F is an appropriate function such as those given in Equations 2 and 3.

Circuit 14 supplies a voltage which is proportional to the value of the appropriate function of reflectance of the color to be matched at each of the different wave lengths of light. In other words, circuit 14 supplies a voltage which is proportional to $F(R)$ where R represents the reflectance of the color to be matched.

Figure 2:
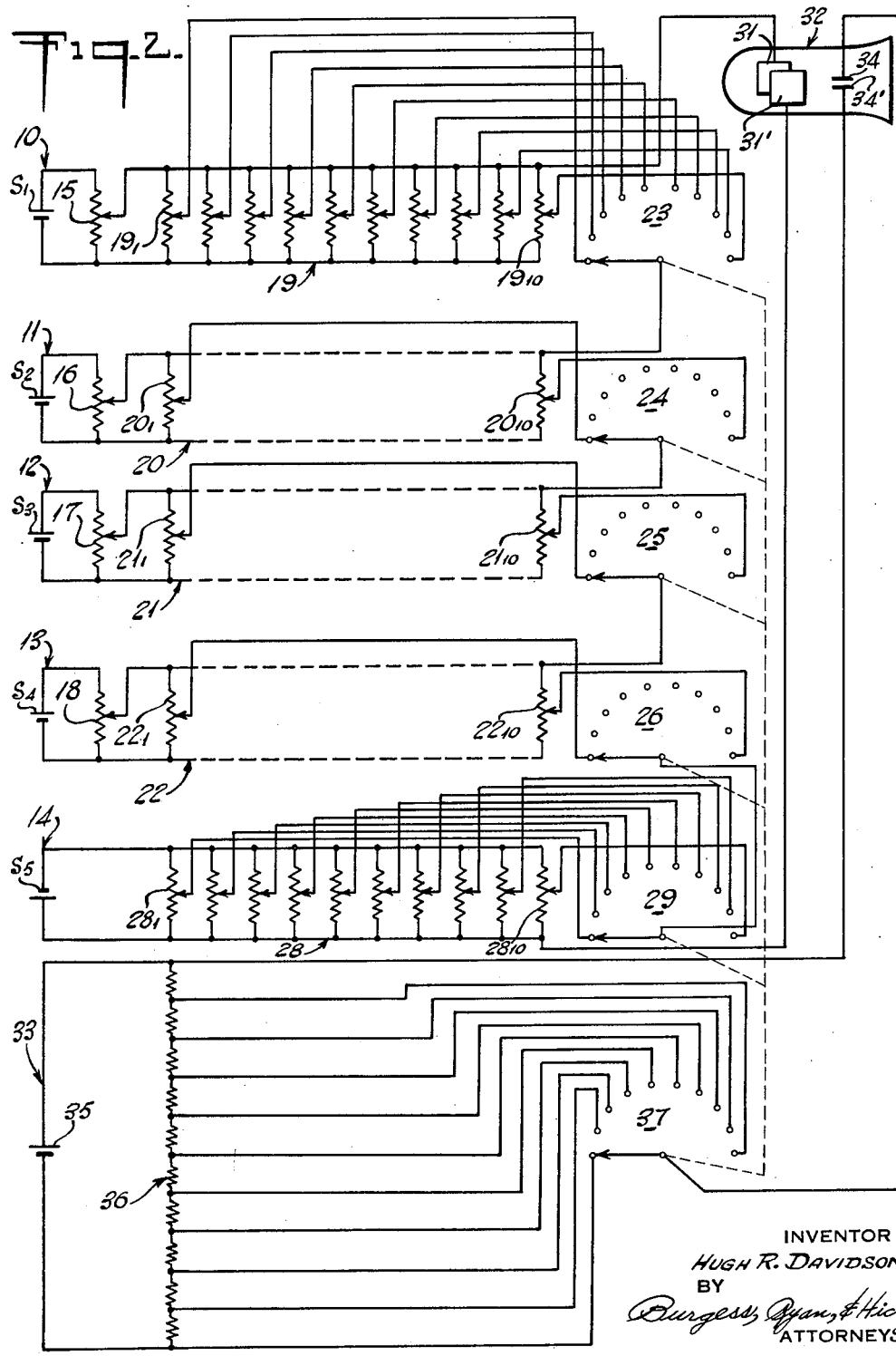
FIG. 2 is a schematic wiring diagram of the color mixture computer shown in FIG. 1.

As shown in FIG. 2, the circuits 10, 11, 12, and 13 for the colorants include potentiometers 15, 16, 17 and 18, respectively, which are connected across suitable sources of voltage such as batteries $S_1$, $S_2$, $S_3$, $S_4$ which supply constant and preferably equal voltages. The settings of the contact arms of the potentiometers correspond to the proportions $a$, $b$, $c$ and $d$ of the respective colorants employed in the mixture and the voltages from the potentiometers are applied across resistor networks 19, 20, 21, and 22, respectively, each of which has a number of resistors connected in parallel. The number of resistors in each of the networks corresponds to the number of wave lengths of light at which the reflectance of the colorants is to be measured and in the illustrated embodiment, each network includes ten resistors, $19_1$—$19_{10}$, $20_1$—$20_{10}$, $21_1$—$21_{10}$, $22_1$—$22_{10}$. However, it will be understood that the number of resistors in the networks may be varied as desired.

The resistors in the networks are tapped so that a voltage proportional to $F(R)$ for the particular colorants at one of the wave lengths of light is obtained from each resistor. The tapped connections to the resistors may be made through adjustable contact arms which are connected to contact terminals of switching devices 23, 24, 25, and 26. The settings of the taps or contact arms for the resistors in each network is determined by measuring the reflectance of the particular colorant at the different wave lengths of light so that $F(R)$ for the colorants at these wave lengths may be calculated from Equations 2 or 3. The resistors may then be set accordingly.

Circuit 14 which produces voltages proportional to $F(R)$ of the color to be matched at the different wave lengths of light includes a suitable source of constant voltage such as a battery $S_5$ which provides a constant voltage of the same value as the sources of voltage in the colorant circuits. The battery $S_5$ is connected across a bank of adjustable resistors 28 which are connected in parallel and correspond in number to the number of wave lengths of light at which the reflectance of the color and the colorants is to be checked. The settings of the resistors $28_1$—$28_{10}$ in the network are determined by measuring the reflectance of the color at the different wave lengths of light and then calculating $F(R)$ for the color at each wave length from Equations 2 or 3. The adjustable contact of each of the resistors $28_1$—$28_{10}$ is connected to one of the contact terminals of a switching device 29.

The switching devices 23, 24, 25, 26, and 29 in the colorant and the color circuits are mechanically connected together so that the outputs of these circuits may be shifted simultaneously to the settings for the different wave lengths of light at which checks are to be made.

The outputs of the circuits for the colorants are connected in series and a voltage proportional to the sum of $aF(R_A)$, $bF(R_B)$, $cF(R_C)$ and $dF(R_D)$ at each wave length of light is obtained. The output of the circuit for the color is also connected in series with the output of the circuits for the colorants but with the voltages obtained therefrom being of the opposite sign. Thus, the combined voltages of these circuits include the terms set forth in Equation 1 and provide an indication as to whether or not Equation 1 is satisfied at the different wave lengths. A visible indication of the resulting voltage may be obtained by connecting the combined output voltages across the vertical control plates 31, 31' of a cathode ray tube 32 or other suitable voltage indicating means.

A circuit 33 which is connected across the horizontal control plates 34, 34' of the cathode ray tube supplies a different voltage thereto for each of the wave lengths of light at which checks are made. The horizontal control circuit includes a source of constant voltage 35 which is connected across the horizontal plates of the tube through a network of resistors 36 which are connected in series and a switching device 37. Thus, a different voltage is supplied to the horizontal control plates at each of the wave lengths at which a check is to be made so that indications from the vertical plates will be spaced relative to each other. The switching device 37 is mechanically connected to the switching devices in the circuits connected to the vertical control plates and is shifted therewith.

Figure 3:
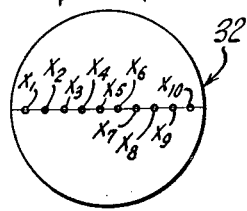
FIGS. 3 and 4 are face views of a cathode ray tube illustrating the operation of the color mixture computer shown in FIG. 1.

When the voltages from the colorant circuits and the color circuit satisfy Equation 1, the voltage applied to the vertical control plates of the cathode ray tube will be zero and the indications appearing on the screen of the cathode ray tube will fall on a zero line or the X-axis which extends horizontally across the face of the tube. When the indications $X_1$—$X_{10}$ at each of the wave lengths of light fall on the zero line, as shown in FIG. 3, the proportions of colorants in the mixture, as shown by the settings of the potentiometers, should provide a close match for the given color.

Figure 4:
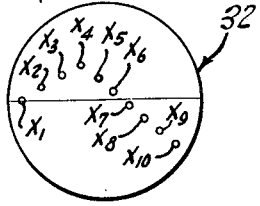

When the voltages applied to the vertical control plates do not satisfy Equation 1 at the various wave lengths of light, the indications $X_1$—$X_{10}$ appearing on the screen of the cathode ray tube will be above or below the horizontal zero line, as shown for example in FIG. 4, and suitable changes can then be made in the potentiometer settings for one or more of the colorants to satisfy Equation 1 so as to bring the indications at each of the wave lengths of light to the horizontal zero line. If the points $X_1$—$X_{10}$ cannot all be brought to the horizontal zero line by such adjustments, it indicates that a correct color match cannot be made with the colorants A, B, C and D. Other colorants may then be tried until the proper combination is found.

Figure 5:
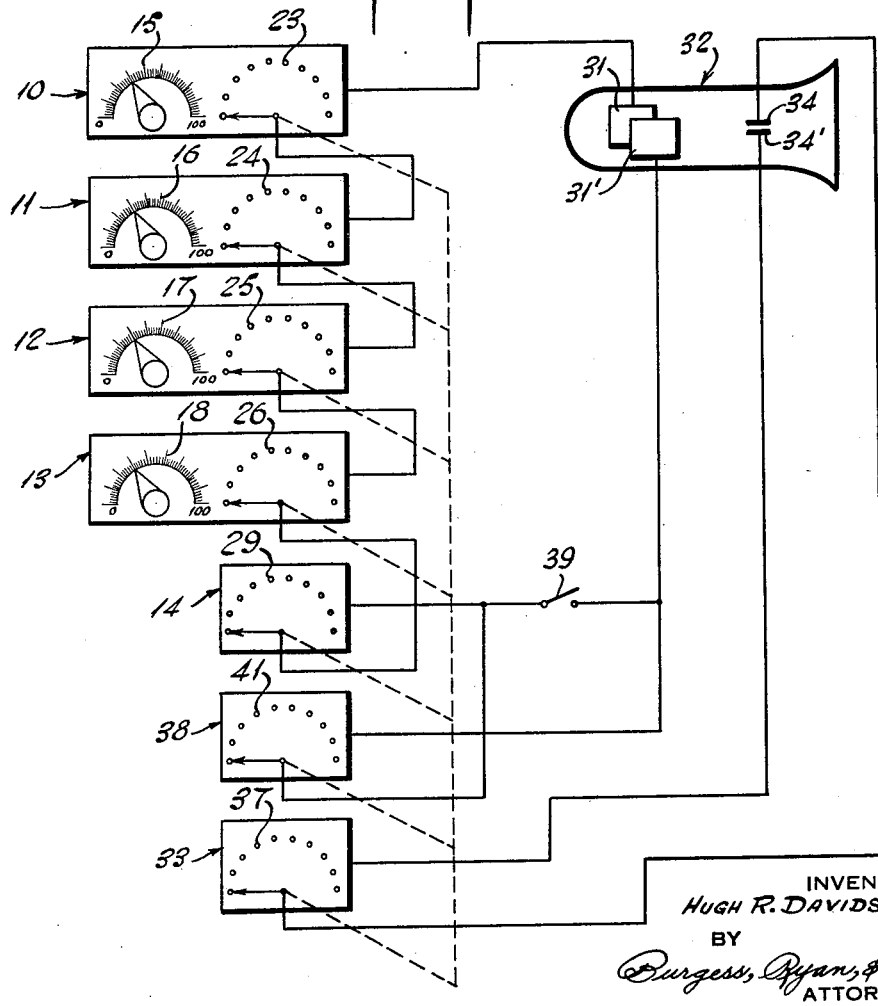
FIG. 5 is a block diagram of a modified form of the color mixture computer shown in FIG. 1.

It has been found to be desirable to check the reflectance of a batch or mixture of the colorants in the proportions determined against the color to be matched and this can be readily done by the embodiment of the invention shown in FIGS. 5 and 6, where a circuit 38 supplies a voltage which is proportional to F(R) of the batch or mixture of the colorants in the proportions previously determined. The batch or mixture circuit is connected in series with the circuits for the colorants and the color and in general, it is similar to the color circuit. It includes a suitable source of constant potential of the same value as the source of voltage for the color circuit such as a battery $S_6$ which is connected through a network of adjustable resistors 40 to contact terminals of a switching device 41. The resistors $40_1$—$40_{10}$ of the network are connected in parallel and the setting of the respective resistors is determined by measuring the reflectance of the batch or mixture of the colorants in the proportions determined and solving Equation 2 or 3.

The batch circuit is connected in series with the color circuit with the voltage obtained from it being of opposite sign to the voltage from the color circuit. When the batch or mixture circuit is in use, the potentiometers in the colorant circuits are set at zero and the output voltages from the color circuit 14 and the batch mixture circuit 38 at each of the wave lengths of light are applied to the cathode ray tube. If an indication appearing on the cathode ray tube is above or below the zero line, an adjustment may then be made in the setting of the potentiometer in one or more of the colorant circuits which will bring the indication on the cathode ray tube to the zero line.

If desired, the output from the color circuit 14 may be connected directly to the vertical control plate through a switch 39 when the batch or mixture circuit is not being used.

Such adjustments in the settings of the potentiometers in the color circuits will indicate the proportion of the particular colorants which should be added to or subtracted from the mixture to obtain a better match with the given color. In order to permit subtraction of a portion of a colorant from the mixture, reversing switches 42, 43, 44, and 45 are incorporated in the circuits for the colorants between the sources of voltage and the potentiometers so that the sign of the voltage obtained therefrom may be reversed when desired.

An example of the settings of the potentiometers and the resistors in the colorant circuits will be described in conjunction with FIGS. 2 and 6. If ten percent of the colorant A is to be used in the mixture, then $a=.10$ and the potentiometer 15 which has scale readings from 0 to 100, is set at a scale reading of 10. Thus, 10% of the voltage V of the source or .10 V is applied across the resistor $19_1$.

If the colorant has a reflectance of 3% at a wavelength of 400 millimicrons and if this is one of the wave lengths at which calculations are to be made, then .03 is substituted for R in Equation 3. Thus, at 400 millimicrons $F(R)=15.7$. Now if the resistance $19_1$ has a total value of 10,000 ohms and if it represents values of F(R) from 0 to 100, the tap is set at $$\frac{15.7}{100} \times 10,000 = 1570 \text{ ohms}$$

Since the voltage applied across the resistor $19_1$ from the potentiometer 15 is .10 V, the voltage between the tap and upper leg of resistor $19_1$ is $$.10 \times \frac{15.7}{100} V$$

or .0157 V and is proportional to $aF(R)$. This procedure is followed in setting the resistors in the colorant circuit for each of the different wave lengths of light.

The determinations for the settings of the resistors 28 in the color circuit and the resistors 40 in the batch circuit are made in the same manner except that the reflectance measurements are made for the given color and for the batch or mixture of colorants at the various wave lengths of light.

It will be understood that any suitable source of a constant voltage may be used in the various circuits and that the number of circuits for the colorants may be varied as desired. In the various embodiments of the invention illustrated and described herein, corresponding parts have been identified by the same reference numerals.

It will also be understood that various changes and modifications, such as the use of alternating current sources of voltage instead of direct current sources of voltage and the use of electronic switching devices in place of mechanical switching devices, may be made in the embodiments of the invention illustrated and described herein without departing from the scope of the invention as defined by the following claims:

1. A color mixture computer for determining the proportion of each of the colorants in a mixture of colorants which is required to match a given color, which comprises a voltage producing network for each colorant in a mixture of colorants, each of said networks being adapted to produce a series of output voltages which are proportional to the amount of a particular colorant in the mixture and to an appropriate function of the reflectance of said colorant at a number of different wave lengths of light; a color circuit for producing a series of output voltages which are proportional to an appropriate function of the reflectance of a given color at said different wave lengths of light, said networks and said color circuit having their outputs connected in series with the output voltage of the color circuit being opposite in sign to the combined output voltages of the networks; a cathode ray tube having vertical and horizontal control plates, said vertical plates being connected to the output from the networks and the color circuit, and means connected to the horizontal plates of the cathode ray tube for applying a different voltage thereto at each of the different wave lengths of light.

2. A color mixture computer for determining the proportions of each of the colorants in a mixture of colorants which is required to match a given color as defined in claim 1 wherein each of the voltage producing networks for the colorants includes a source of voltage, means connected to said source of voltage for adjusting the output voltage of the network to correspond to the proportion of the particular colorant in the mixture, a series of resistors connected to said last-mentioned means, each of said resistors being set at a predetermined value to produce a voltage proportional to an appropriate function of the reflectance of the particular colorant at one of the different wave lengths of light, and a switch for selectively connecting said resistors in the output of the network.

3. A color mixture computer for determining the proportions of each of the colorants in a mixture of colorants which is required to match a given color as defined in claim 1 wherein each of the voltage producing networks for the colorants includes a source of voltage means connected to said source of voltage for adjusting the output voltage of the network to correspond to the proportion of the particular colorant in the mixture, a series of resistors connected to said last-mentioned means, each of said resistors being set at a predetermined value to produce a voltage proportional to an appropriate function of the reflectance of the particular colorant at one of the different wave lengths of light, a switch for selectively connecting said resistors in the output of the network and the color circuit includes a source of voltage, a series of resistors connected to the source of voltage, each of said resistors being set at a predetermined value to produce a voltage proportional to a function of the reflectance of the color at one of the wave lengths of light, and a switch for selectively connecting said resistors in the output of the color circuit.

4. A color mixture computer for determining the proportion of each colorant required in a mixture of colorants to match a given color, which comprises the combination of a plurality of voltage producing networks, one for each colorant in a mixture of colorants, each of said networks being adapted to produce a series of output voltages which are proportional to the amount of a particular colorant in the mixture and a selected function of the reflectance of said colorant at a number of different wave lengths of light; a color circuit for producing a series of output voltages which are proportional to a selected function of the reflectance of a given color at the said different wave lengths of light, said networks and said color circuit having their outputs connected in series with the output voltage of the color circuit being opposite in sign to the combined output voltages of the networks; and means for visually and simultaneously displaying the sum of the output voltages from the networks and the color circuit for each of the different wave lengths of light.

5. A color mixture computer for determining the proportion of each colorant required in a mixture of colorants to match a given color, which comprises the combination as defined in claim 4 wherein each of the voltage producing networks for the colorants includes a source of constant voltage, a potentiometer connected across said source of voltage, a series of tapped resistors connected across the output side of the potentiometer, each of said resistors being tapped at a value which produces a voltage proportional to the selected function of reflectance of the particular colorant at one of the different wave lengths of light and a switch for selectively connecting said resistors in the output of the network.

6. A color mixture computer for determining the proportion of each colorant required in a mixture of colorants to match a given color, which comprises the combination as defined in claim 4 wherein each of the voltage producing networks for the colorants includes a source of constant voltage, a potentiometer connected across said source of voltage, a series of tapped resistors connected across the output side of the potentiometer, each of said resistors being tapped at a value which produces a voltage proportional to the selected function of reflectance of the particular colorant at one of the different wave lengths of light, and a switch for selectively connecting the resistors in the output of the network; and the color circuit includes a source of constant voltage, a series of tapped resistors connected across said source of voltage, each of said resistors being tapped at a value which produces a voltage which is proportional to the selected function of the reflectance of the given color at one of the different wave lengths of light and a switch for selectively connecting said resistors in the output of the color circuit.

7. A system for comparing the light reflectance of a mixture containing a plurality of colorants with the light reflectance of a given color at a series of different wave lengths of light which comprises the combination of a plurality of voltage producing networks each of which is adapted to produce a series of output voltages which are proportional to the amount of a particular colorant in a mixture of a plurality of colorants and to an appropriate function of the reflectance of said colorant at a series of different wave lengths of light; a voltage producing circuit which is adapted to produce a series of output voltages which are proportional to an appropriate function of the reflectance of a given color at said different wave lengths of light, said networks and said circuit being connected in series with the combined output voltages of the networks being opposite in sign to the output voltage of the circuit; and means for visually and simultaneously displaying the sums of selected output voltages from said networks and said circuit.

8. A system for comparing the light reflectance of a mixture containing a number of colorants with the light reflectance of a given color at a series of different wave lengths of light, which comprises the combination of a plurality of voltage producing networks each of which is adapted to produce a series of output voltages which are proportional to the amount of a particular colorant in a mixture of colorants and an appropriate function of the reflectance of said colorant at a series of different wave lengths of light, each of said networks including a source of constant voltage, a potentiometer connected across said source of voltage, a series of resistors connected across the output of the potentiometer, each of said resistors being tapped at a predetermined value to produce a voltage proportional to a function of the reflectance of the particular colorant at one of the said different wave lengths of light and a switch for selectively connecting the resistors in the output of the network; a voltage producing circuit for producing a series of output voltages which are proportional to an appropriate function of the reflectance of a given color at each of the different wave lengths of light, the outputs of said colorant networks and said color circuit being connected in series with the output voltage from the color circuit being opposite in sign to the combined output voltages of the colorant networks, and means for visually and simultaneously displaying the sum of the output voltages of the colorant networks and the color circuit for each of the different wave lengths of light.

9. A system for comparing the light reflectance of a mixture containing a number of colorants with the light reflectance of a given color at a series of different wave lengths of light, which comprises in combination a plurality of voltage producing networks each of which is adapted to produce a series of output voltages which are proportional to the amount of a particular colorant in a mixture of colorants and an appropriate function of the reflectance of said colorant at a series of different wave lengths of light, each of said networks including a source of constant voltage, a potentiometer connected across said source of voltage, a series of resistors connected across the output of the potentiometer, each of said resistors being tapped at a predetermined value to produce a voltage proportional to a function of the reflectance of the particular colorant at one of the said different wave lengths of light and a switch for selectively connecting the resistors in the output of the network; a voltage producing circuit for producing a series of output voltages which are proportional to an appropriate function of the reflectance of a given color at each of the different wave lengths of light, said circuit including a source of constant voltage, a series of tapped resistors connected across said source of voltage, each of said resistors being tapped at a value to produce a voltage proportional to an appropriate function of the reflectance of the given color at one of the different wave lengths of light and a switch for selectively connecting said resistors in the output of said circuit; the outputs of said networks and said circuit being connected in series with the output voltage of the circuit being opposite in sign to the combined output voltages of the networks, and means for visually and simultaneously displaying in spaced relation the sum of the output voltages of the networks and the circuit for each of the different wave lengths of light.

10. A system for comparing the light reflectance of a mixture containing a number of colorants with the light reflectance of a given color at a series of different wave lengths of light, which comprises in combination a plurality of voltage producing networks each of which is adapted to produce a series of output voltages which are proportional to the amount of a particular colorant in a mixture of colorants and to an appropriate function of the reflectance of said colorant at a series of different wave lengths of light, each of said networks including a source of constant voltage, a potentiometer connected across said source of voltage, a series of resistors connected across the output of the potentiometer, each of said resistors being tapped at a value to produce a voltage proportional to a function of the reflectance of the particular colorant at one of the said different wave lengths of light and a switch for selectively connecting the resistors in the output of the network; a voltage producing circuit for producing a series of output voltages which are proportional to an appropriate function of the reflectance of a given color at each of the different wave lengths of light, said circuit including a source of constant voltage, a series of tapped resistors connected across said source of voltage, each of said resistors being tapped at a value to produce a voltage proportional to an appropriate function of the reflectance of the given color at one of the different wave lengths of light and a switch for selectively connecting said resistors in the output of said circuit; the outputs of said networks and said circuit being connected in series with the output voltage of the color circuit being opposite in sign to the combined output voltages of the networks; and means for visually and simultaneously displaying the sum of the output voltages of the networks and the color circuit for each of the different wave lengths of light with the sums of the voltages for the different wave lengths being spaced relative to each other along a common axis.

11. A system for comparing the light reflectance of a mixture containing a number of colorants with the light reflectance of a given color at a series of different wave lengths of light, which comprises in combination a plurality of voltage producing networks each of which is adapted to produce a series of output voltages which are proportional to the amount of a particular colorant in a mixture of colorants and to an appropriate function of the reflectance of said colorant at a series of different wave lengths of light, each of said networks including a source of constant voltage, a potentiometer connected across said source of voltage, a series of resistors connected across the output of the potentiometer, each of said resistors being tapped at a value which is proportional to a function of the reflectance of the particular colorant at one of the said different wave lengths of light and a switch for selectively connecting the resistors in the output of the network; a voltage producing circuit for producing a series of output voltages which are proportional to an appropriate function of the reflectance of a given color at each of the different wave lengths of light, said circuit means including a source of constant voltage, a series of tapped resistors connected across said source of voltage, each of said resistors being tapped at a value proportional to an appropriate function of the reflectance of the given color at one of the different wave lengths of light and a switch for selectively connecting said resistors in the output of said circuit; the outputs of said networks and said circuit being connected in series with the output voltage of the circuit being opposite in sign to the combined output voltages of the networks; and means for indicating the sum of the output voltages of the networks and the circuit at each of the different wave lengths of light, said last mentioned means including a cathode ray tube having a pair of control plates connected to the output from the networks and the circuit, a second pair of control plates, a source of voltage connected to said second pair of control plates and means for changing the last-mentioned voltage for each of the different wave lengths of light.

12. A color mixture computer for determining the proportion of each colorant required in a mixture of colorants to match a given color, which comprises the combination of a plurality of voltage producing networks, one for each colorant in a mixture of colorants, each of said networks being adapted to produce a series of output voltages which are proportional to the amount of a particular colorant in the mixture and a selected function of the reflectance of said colorant at a number of different wave lengths of light; a color circuit for producing a series of output voltages which are proportional to a selected function of the reflectance of a given color at the said different wave lengths of light, said networks and said color circuit having their outputs connected in series with the output voltage of the color circuit being opposite in sign to the combined output voltages of the networks, and means for visually and simultaneously displaying the sum of the output voltages from the networks and the color circuit for each of the different wave lengths of light with the sums of the voltages for the different wave lengths of light being spaced along a common zero axis and with differences between the respective sums and zero being represented by displacements relative to said zero axis.

References Cited in the file of this patent

UNITED STATES PATENTS

| | | |
|---|---|---|
| 2,540,797 | Stearns | Feb. 6, 1951 |
| 2,752,093 | Bush et al. | June 26, 1956 |
| 2,803,399 | Morgan et al. | Aug. 20, 1957 |

FOREIGN PATENTS

| | | |
|---|---|---|
| 1,058,621 | France | Nov. 4, 1953 |
| 772,085 | Great Britain | Apr. 10, 1957 |